US010967753B2

(12) United States Patent
Kusumi (10) Patent No.: US 10,967,753 B2
(45) Date of Patent: Apr. 6, 2021

(54) VEHICLE, CHARGER, CHARGING SYSTEM INCLUDING CHARGER, AND ABNORMALITY DIAGNOSIS METHOD FOR CHARGER

(71) Applicant: Toyota Jidosha Kabushiki Kaisha, Toyota (JP)

(72) Inventor: Hidetoshi Kusumi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 152 days.

(21) Appl. No.: 16/254,039

(22) Filed: Jan. 22, 2019

(65) Prior Publication Data

US 2019/0232813 A1    Aug. 1, 2019

(30) Foreign Application Priority Data

Jan. 26, 2018    (JP) .............................. JP2018-011699

(51) Int. Cl.
| | |
|---|---|
| *H02J 7/00* | (2006.01) |
| *B60L 53/62* | (2019.01) |
| *G07C 5/00* | (2006.01) |
| *B60L 53/30* | (2019.01) |
| *B60L 53/66* | (2019.01) |
| *B60L 53/14* | (2019.01) |
| *B60L 53/68* | (2019.01) |
| *B60L 53/67* | (2019.01) |

(52) U.S. Cl.
CPC ............... *B60L 53/62* (2019.02); *B60L 53/14* (2019.02); *B60L 53/305* (2019.02); *B60L 53/66* (2019.02); *B60L 53/67* (2019.02); *B60L 53/68* (2019.02); *G07C 5/008* (2013.01); *B60L 2240/36* (2013.01)

(58) Field of Classification Search
CPC .......... B60L 53/62; B60L 53/14; B60L 53/68; B60L 53/67; B60L 53/305; B60L 53/66; B60L 2240/36; G07C 5/008; Y02T 90/16
USPC ............................................ 320/109; 701/22
See application file for complete search history.

(56) References Cited

U.S. PATENT DOCUMENTS

| | | | |
|---|---|---|---|
| 2010/0207588 A1* | 8/2010 | Lowenthal | ............ B60L 53/665 320/165 |
| 2016/0124050 A1 | 5/2016 | Hua | |
| 2016/0207409 A1 | 7/2016 | Ueo | |

FOREIGN PATENT DOCUMENTS

JP        2010-220299 A        9/2010

* cited by examiner

*Primary Examiner* — Zixuan Zhou
(74) *Attorney, Agent, or Firm* — Dinsmore & Shohl LLP

(57) ABSTRACT

A vehicle includes: an inlet configured to allow a connector of a charging cable to be inserted into the inlet; a battery configured to be charged from a charger through the connector and the inlet; a communication device configured to perform communication with a server; and an ECU configured to control charging. The ECU diagnoses whether there is an abnormality in the charger, when where the charger and the vehicle are connected to each other through the charging cable, the abnormality being able to be diagnosed in a state where the connector has been inserted into the inlet, and sends information indicating an abnormality occurrence, to the server through the communication device, when where the ECU diagnoses the charger as having the abnormality.

6 Claims, 7 Drawing Sheets

INFO

| CHARGER ID | INSTALLATION LOCATION | CHARGING STANDARD | CHARGING PRICE | NORMAL/ ABNORMAL |
|---|---|---|---|---|
| ⋮ | | | | |
| X1001 | | | | NORMAL |
| X1002 | | | | NORMAL |
| X1003 | | | | NORMAL |
| X1004 | | | | ABNORMAL |
| X1005 | | | | NORMAL |
| X1006 | | | | NORMAL |
| ⋮ | | | | |

FIG. 8

VEHICLE, CHARGER, CHARGING SYSTEM INCLUDING CHARGER, AND ABNORMALITY DIAGNOSIS METHOD FOR CHARGER

CROSS-REFERENCE TO RELATED APPLICATIONS

This application claims priority to Japanese Patent Application No. 2018-011699 filed on Jan. 26, 2018, which is incorporated herein by reference in its entirely including the specification, drawing and abstract.

BACKGROUND

1. Technical Field

The disclosure relates to a vehicle, a charger, a charging system including the charger, and an abnormality diagnosis method for a charger, and more particularly, relates to an abnormality diagnosis technology in plug-in charging in which an in-vehicle electric storage device is charged with electric power that is supplied from a charger outside of a vehicle.

2. Description of Related Art

In recent years, with increase in environmental awareness, vehicles such as plug-in hybrid vehicles and electric vehicles have attracted attention. Each of the vehicles is configured to allow "plug-in charging" in which an in-vehicle electric storage device is charged with electric power that is supplied from a charger provided outside of the vehicle through a connector of the charging cable and an inlet.

In some cases, an abnormality (failure) occurs on a charging path from the charger to the electric storage device, and there has been proposed a technology of informing a user of the abnormality in that case. For example, a charging system disclosed in Japanese Patent Application Publication No. 2010-220299 informs a user (occupant) of the vehicle of the abnormality on the charging path, in the case where the impedance of the charging path exceeds a reference value.

SUMMARY

Chargers for household use are generally managed by the users of vehicles. Therefore, in the case where an abnormality occurs on a charging path from a charger for household use, the user of the vehicle can take a response, for example, can request a maintenance agency or the like to inspect and repair the charging path, when the user of the vehicle is informed of the occurrence of the abnormality as described in Japanese Patent Application Publication No. 2010-220299.

On the other hand, the abnormality on the charging path from the charger can occur also in a charger that is not managed by the user of the vehicle, for example, in a public charger (also called a charging stand or a charging station). In this case, there is a possibility that the user of the vehicle does net take an appropriate response such as repair, even when the user of the vehicle is informed of the occurrence of the abnormality.

The inventor focuses, particularly, on an abnormality of the charger that is able to be diagnosed in a state where the connector of the charging cable has been inserted into the inlet. As a specific example of the abnormality, there is a connection abnormality (a terminal breakage, a contact failure or the like) between an inlet terminal and a connector terminal in the state where the connector has been inserted into the inlet. This abnormality is often difficult to diagnose in a state where the charger and the vehicle are not connected to each other through the charging cable. Further, for the above-described reason, there is a possibility that an appropriate response is not taken for the public charger, even if the charger is diagnosed as having the abnormality.

The disclosure provides a technology for taking an appropriate response in the case of the occurrence of the charger abnormality that is able to be diagnosed in the state where the connector of the charging cable has been inserted into the inlet.

A first aspect of the disclosure discloses a vehicle configured to perform communication with a charger provided outside of the vehicle through a charging cable. The vehicle includes: an inlet configured to allow a connector of the charging cable to be inserted into the inlet; an electric storage device configured to be charged from the charger through the connector and the inlet; a communication device configured to perform communication with an external apparatus other than the charger provided outside of the vehicle; and an electronic control unit configured to control charging through the connector and the inlet. The electronic control unit is configured to diagnose whether there is an abnormality in the charger, when the charger and the vehicle are connected to each other through the charging cable, the abnormality being able to be diagnosed in a state where the connector has been inserted into the inlet, and is configured to send information indicating an abnormality occurrence, to the external apparatus through the communication device, when the electronic control unit diagnoses the charger as having the abnormality.

The inlet in the first aspect may be configured such that: the inlet includes an inlet terminal; the connector includes a connector terminal configured to output electric power in a state where the connector terminal is electrically connected to the inlet terminal; and information indicating a connection abnormality between the inlet terminal and the connector terminal in the state where the connector has been inserted into the inlet is sent to the external apparatus, as the information indicating the abnormality occurrence.

With the above configuration, the information indicating the abnormality occurrence is sent to the external apparatus in the case where the charger is diagnosed as having the abnormality that is able to be diagnosed in the state where the connector has been inserted into the inlet. Thereby, a user, administrator or the like of the external apparatus can take an appropriate response for the charger.

The vehicle in the first aspect may further include a charging line; a voltage sensor configured to detect voltage of the charging line; and a current sensor configured to detect electric current that flows along the charging line, wherein the electronic control unit is configured to calculate a supply electric power from the charger based on detection results of the voltage sensor and the current sensor, the electronic control unit is configured to send the information indicating the abnormality occurrence, to the external apparatus, when the electronic control unit gives a notice of a command including an electric power command value, to the charger and the electronic control unit determines that the supply electric power does not satisfy the electric power command value in the state where the connector has been inserted into the inlet.

For example, in the case where at least one of the inlet terminal and the connector terminal is broken, transmission of electric power cannot be normally performed. With the above configuration, in the case where the detector docs not detect the supply electric power satisfying the electric power command value in the state where the connector has been inserted into the inlet, the electronic control unit determines that there is a possibility of the occurrence of the connection abnormality (the terminal breakage described above) between the inlet terminal and the connector terminal, and sends the information indicating the abnormality occurrence. Thereby, the user, administrator or the like of the external apparatus can take an appropriate response such as the repair or replacement of the terminal.

The connector in the first aspect may be configured such that: the connector further includes a temperature sensor that detects a temperature of the connector terminal; the charger further includes a control circuit that receives a signal from the temperature sensor; the control circuit is configured to diagnose whether there is an abnormal heat generation in the connector based on the signal from the temperature sensor during sending of electric power from the charger; and the electronic control unit is configured to send the information indicating the abnormality occurrence, to the external apparatus, when the electronic control unit receives, from the charger, a notice indicating that the abnormal heat generation of the connector terminal has occurred.

For example, in the case of the occurrence of the contact failure between the inlet terminal and the connector terminal, the resistance at a spot of the contact failure increases so that heat loss increases, compared to the case where the inlet terminal and the connector terminal are normally connected to each other. As a result, the abnormal heat generation can occur. With the above configuration, in the case where the charger gives, to the electronic control unit, the notice that the temperature sensor has detected the abnormal heat generation of the connector terminal during the sending of the electric power from the charger, the electronic control unit determines that there is a possibility of the occurrence of the connection abnormality (the terminal breakage described above) between the inlet terminal and the connector terminal, and sends the information indicating the abnormality occurrence, to the external apparatus. Thereby, the user, administrator or the like of the external apparatus can take an appropriate response such as the repair or replacement of the terminal.

The inlet in the first aspect may be configured such that: the inlet further includes a temperature sensor that detects a temperature of the inlet terminal; the electronic control unit is configured to receive a signal from the temperature sensor and diagnoses whether there is an abnormal heat generation in the inlet during receiving of electric power from the charger; and the electronic control unit is configured to send the information indicating the abnormality occurrence, to the external apparatus, when the electronic control unit diagnoses that the abnormal heat generation of the inlet terminal has occurred.

With the above configuration, it is possible to diagnose the possibility of the occurrence of the connection abnormality (the terminal breakage described above) between the inlet terminal and the connector terminal, based on temperature rise on the inlet terminal side, similarly to the diagnosis based on temperature rise on the connector terminal side. Thereby, similarly, the user, administrator or the like of the external apparatus can take an appropriate response such as the repair or replacement of the terminal.

The external apparatus in the first aspect may be configured to include at least one of a vehicle other than the vehicle, and a server that manages whether there is an abnormality in a plurality of chargers including the charger.

With the above configuration, it is possible to inform a user of the different vehicle of the abnormality. Thereby, the user of the different vehicle can perform charging with a charger that is different from the charger having the abnormality. Further, by sending the information indicating the abnormality occurrence, to the server, it is possible to inform the server (or the administrator of the server) of the abnormality. Thereby, the server updates charger information, and therefore, it is possible to take an appropriate response for the charger having the abnormality.

A second aspect of the disclosure discloses a charger configured to charge an electric storage device mounted on a vehicle through a charging cable. The charger is configured to perform communication with the vehicle through the charging cable. The vehicle includes an inlet configured to allow a connector of the charging cable to be inserted into the inlet. The charger includes: a communication device configured to perform communication with an external apparatus other than the vehicle; and a control circuit that controls charging. The control circuit diagnoses whether there is an abnormality in the charger, when the charger and the vehicle are connected to each other through the charging cable, the abnormality being able to be diagnosed in a state where the connector has been inserted into the inlet, and sends information indicating an abnormality occurrence, to the external apparatus through the communication device, when the control circuit diagnoses the charger as having the abnormality.

The inlet in the second aspect may be configured such that: the inlet includes an inlet terminal; the connector includes a connector terminal configured to output electric power in a state where the connector terminal is electrically connected to the inlet terminal; and information indicating a connection abnormality between the inlet terminal and the connector terminal is sent as the information indicating the abnormality occurrence.

With the above configurator, the information indicating the abnormality is sent to the external apparatus in the case where the charger is diagnosed as having the abnormality that is able to be diagnosed in the state where the connector has been inserted into the inlet. Thereby, the user, administrator or the like of the external apparatus can take an appropriate response for the charger.

The vehicle in the second aspect may further include a charging line, a voltage sensor configured to detect voltage of the charging line, a current sensor configured to detect electric current that flows along the charging line, and an electronic control unit configured to calculate a supply electric power from the charger based on the detection results of the voltage sensor and the current sensor; and the control circuit is configured to send the information indicating the abnormality occurrence, to the external apparatus, when the vehicle gives, to the control circuit, a notice that the electronic control unit determines that the supply electric power does not satisfy an electric power command value given from the vehicle in the state where the connector has been inserted into the inlet.

With the above configuration, similarly, the user, administrator or the like of the external apparatus can take an appropriate response such as the repair or replacement of the terminal.

The connector in the second aspect may be configured such that: the connector further includes a temperature sensor that detects a temperature of the connector terminal; the control circuit is configured to receive a signal from the temperature sensor and diagnoses whether there is an abnormal heat generation in the connector during sending of electric power from the charger; and the control circuit is configured to send the information indicating the abnormality occurrence, to the external apparatus, when the control circuit diagnoses the abnormal heat generation of the connector terminal.

With the above configuration, similarly, the user, administrator or the like of the external apparatus can take an appropriate response such as the repair or replacement of the terminal.

The inlet in the second aspect may be configured such that: the inlet further includes a temperature sensor that detects a temperature of the inlet terminal; the vehicle further includes an electronic control unit that receives a signal from the temperature sensor; the electronic control unit is configured to determine whether there is an abnormal heat generation in the inlet based on the signal from the temperature sensor during receiving of electric power from the charger; and the control circuit is configured to send the information indicating the abnormality occurrence, to the external apparatus, when the vehicle gives, to the control circuit, a notice that the electronic control unit determines the abnormal heat generation of the inlet terminal.

With the above configuration, similarly, the user, administrator or the like of the external apparatus can take an appropriate response such as the repair or replacement of the terminal.

A third aspect of the disclosure discloses a charging system. The charging system includes: the charger in the second aspect; and the external apparatus. The external apparatus includes a server that manages charger information indicating whether there is an abnormality in a plurality of chargers including the charger, and the server updates the charger information, in response to the received information indicating the abnormality occurrence.

With the above configuration, since the server updates the charger information in response to the received information indicating the abnormality occurrence, it is possible to perform various processes bused on the updated charger information (in other words, the latest charger information). For example, in the case where a guide request for a charger is issued from a vehicle, it is possible to guide the vehicle to a charger having no abnormality.

A fourth aspect of the disclosure discloses an abnormality diagnosis method for a charger. The charger is configured to charge an electric storage device mounted on a vehicle through a charging cable. The abnormality diagnosis method includes: diagnosing whether there is an abnormality in the charger, when the charger and the vehicle are connected to each other through the charging cable, the abnormality being able to be diagnosed in a state where a connector of the charging cable has been inserted into an inlet of the vehicle: and sending information indicating an abnormality occurrence, to an external apparatus, in a case of diagnosing the charger as having the abnormality, the external apparatus being an apparatus that is provided outside of the vehicle and that is other than the charger.

With the above method, similarly to the first and second aspects, the user, administrator or the like of the external apparatus can take an appropriate response for the charger.

According to the disclosure, in the case where the abnormality occurs on the charging path from the charger, which is not managed by the user of the vehicle, the user, administrator or the like of the external apparatus can take an appropriate response.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments in the disclosure will be described in detail, with reference to the drawings. In the drawings, identical or equivalent parts are denoted by identical reference characters, and descriptions therefor will not be repeated.

First Embodiment

Overall Configuration of Charging System

Figure 1:
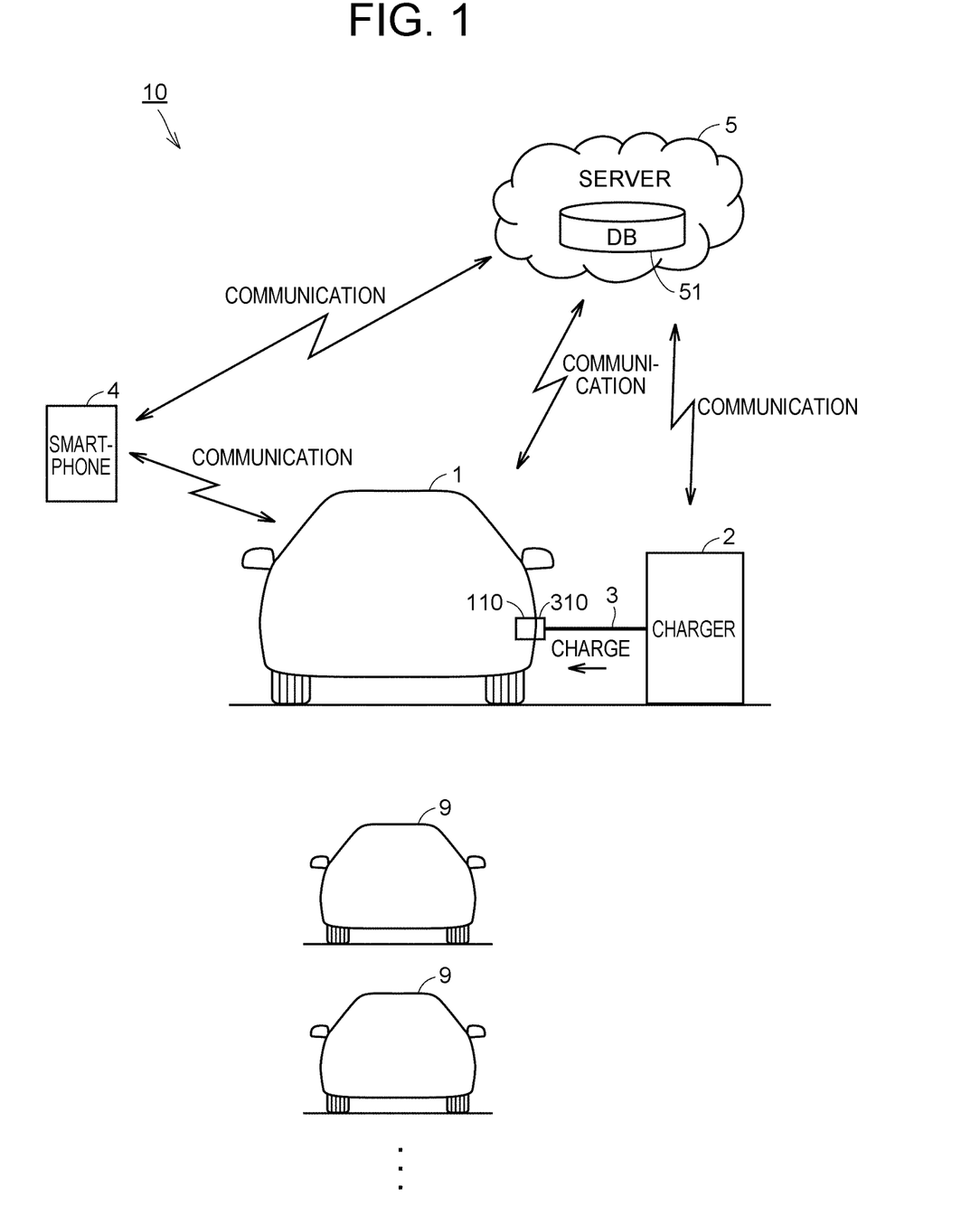
FIG. 1 is an overall configuration diagram of a charging system according to a first embodiment in the disclosure.

FIG. 1 is an overall configuration diagram of a charging system according to a first embodiment in the disclosure. With reference to FIG. 1, a charging system 10 includes a vehicle 1, a charger 2, a charging cable 3, a smartphone 4 and a server 5.

The vehicle 1 and the charger 2 can be electrically connected to each other through the charging cable 3. The vehicle 1 is a vehicle of a certain user (not illustrated), and is a plug-in hybrid vehicle for example. The vehicle 1 only needs to be configured to allow charging through the charging cable, and may be an electric vehicle.

FIG. 1 illustrates a situation in which charging with the charger 2 is performed to the vehicle 1. For example, the charger 2 is a public charger (a charging stand or a charging station). Therefore, charging with the charger 2 can be performed to each of a plurality of vehicles 9 other than the vehicle 1.

The vehicle 1, the smartphone 4 and the server 5 can perform wireless communication with each other. Further, the charger 2 and the server 5 can perform wireless communication with each other. Although not illustrated, the vehicle 1 can also perform wireless communication with another vehicle 9 and the server 5, and a smartphone (not illustrated) of a user of each vehicle 9 and the server 5 can perform wireless communication with each other.

The smartphone 4 is used forgiving information about the charging to the user of the vehicle 1. It is not essential to use the smartphone 4 for informing the user, and it is allowable to use, for example, a monitor (a monitor of a car navigation system) provided in the vehicle 1, for informing the user.

The server 5 includes a CPU, a memory and a buffer, each of which is not illustrated. The server 5 includes a charger information database 51 in which information (charger information INFO) about many chargers including the charger 2 is stored. Details of the charger information INFO will be described later (see FIG. 7). A part or whole of the server 5 may be configured to execute arithmetic processes with hardware such as electronic circuits.

Figure 2:
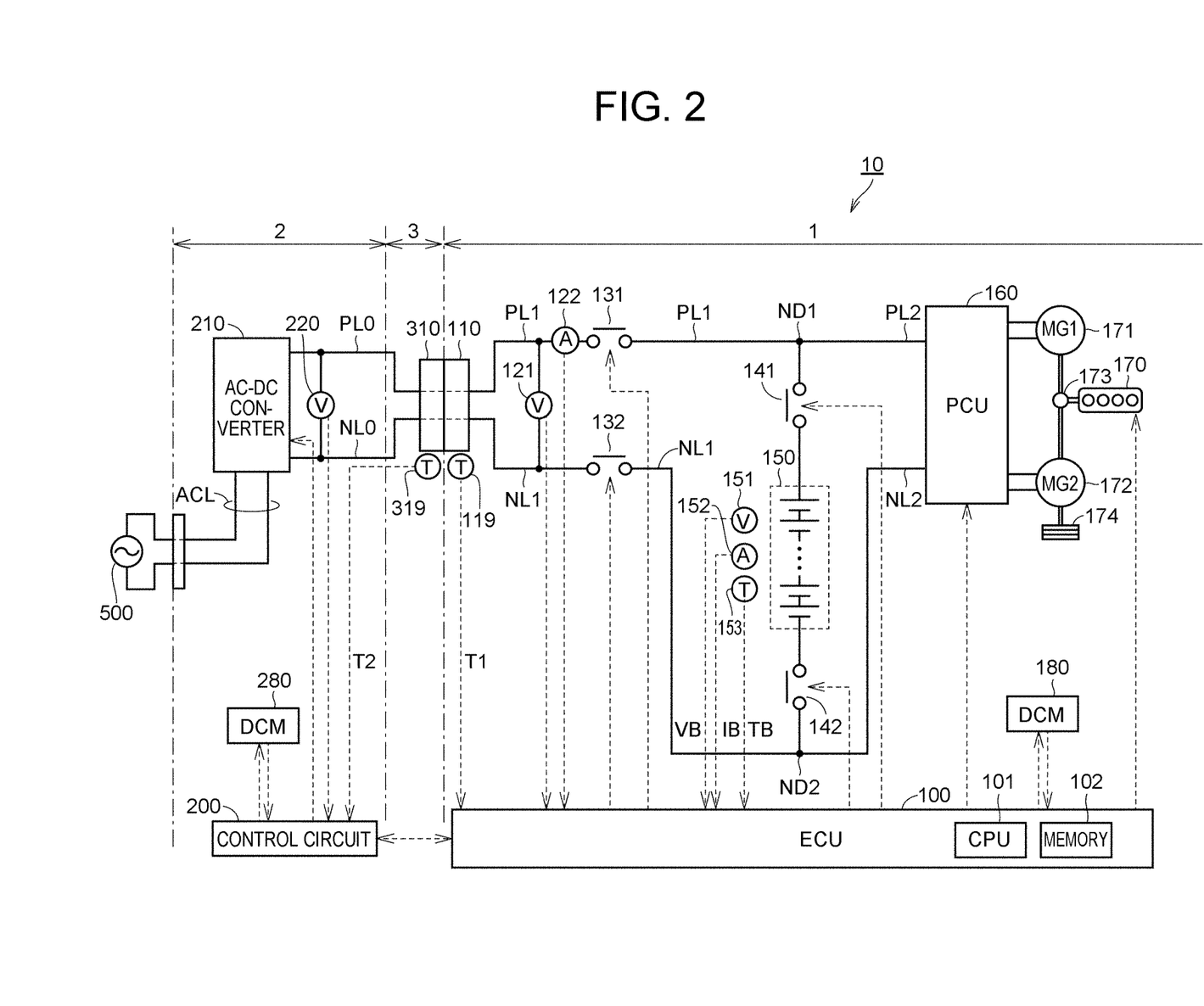
FIG. 2 is a block diagram schematically showing configurations of a vehicle, a charger and a charging cable according to the first embodiment.

FIG. 2 is a block diagram schematically showing configurations of the vehicle 1, the charger 2 and the charging cable 3 according to the first embodiment. With reference to FIG. 2, for example, the charger 2 is a charger for DC charging, and converts alternating-current power from a utility grid power supply 500, into direct-current power for charging a battery 150 mounted on the vehicle 1, and outputs the direct-current power. The charger 2 includes electric power lines ACL, an AC-DC converter 210, a voltage sensor 220, electric power supply lines PL0, NL0 and a control circuit 200.

The electric power lines ACL are electrically connected to the utility grid power supply 500. The electric power lines ACL transmit the alternating-current power from the utility grid power supply 500, to the AC-DC converter 210.

The AC-DC converter 210 converts the alternating-current power on the electric power lines ACL, into the direct-current power for charging the battery 150 mounted on the vehicle 1. The electric power conversion by the AC-DC converter 210 may be executed as a combination of an AC-DC conversion for power factor improvement and a DC-DC conversion for voltage level adjustment. The direct-current power output from the AC-DC converter 210 is supplied through the electric power supply line PL0 on the positive electrode side and the electric power supply line NL0 on the negative electrode side.

The voltage sensor 220 is provided between the electric power supply lines PL0, NL0. The voltage sensor 220 detects the voltage between the electric power supply lines PL0, NL0, and outputs the detection result to the control circuit 200.

The control circuit 200 is configured to include a central processing unit (CPU), a memory and input-output ports (not illustrated), each of which is not illustrated. The control circuit 200 controls the charger 2 based on the voltage detected by the voltage sensor 220, signals from various switches and the vehicle 1, and a map and program stored in the memory.

A charging connector 310 of the charging cable 3 is provided with a temperature sensor 319 that detects a temperature T2 of the charging connector 310 (more specifically, at least one of a P terminal 312 and an N terminal 313). The control circuit 200 receives a signal indicating the temperature T2 from the temperature sensor 319, and thereby, can diagnose whether there is an abnormality (more specifically, an abnormal heat generation) in the charging connector 310.

The vehicle 1 includes a vehicle inlet 110, charging lines PL1, NL1, a voltage sensor 121, a current sensor 122, vehicle contactors 131, 132, system main relays 141, 142, and a battery 150, electric power lines PL2, NL2, a power control unit (PCU) 160, an engine 170, motor generators 171, 172, a power split device 173, a driving wheel 174, a communication module 180, and an electronic control unit (ECU) 100.

The vehicle inlet (charging port) 110 is configured to allow the charging connector 310 of the charging cable 3 to be electrically connected to the vehicle inlet 110. More specifically, the charging connector 310 is inserted into the vehicle inlet 110 with mechanical coupling such as fitting. Thereby, an electric connection between the electric power supply line PL0 and a contact on the positive electrode side of the vehicle inlet 110 is secured, and an electric connection between the electric power supply line NL0 and a contact on the negative electrode side of the vehicle inlet 110 is secured. Further, by the connection between the vehicle inlet 110 and the charging connector 310 through the charging cable. The ECU 100 of the vehicle 1 and the control circuit 200 of the charger 2 can mutually send and receive a variety of signals, commands and information (data), by a communication according to a predetermined communication such as Controller Area Network (CAN) or by a communication with an analog signal through an analog control line.

Similarly to the charging connector 310 of the charging cable 3, the vehicle inlet 110 is provided with a temperature sensor 119 that detects a temperature T1 of the vehicle inlet 110 (more specifically, at feast one of a P terminal 112 and an N terminal 113). The ECU 100 receives a signal indicating the temperature T1 from the temperature sensor 119, and thereby, can diagnose whether there is an abnormality such as an abnormal heat generation, in the vehicle inlet 110.

The voltage sensor 121 is provided between the charging line PL1 and the charging line NL1, so as to be closer to the vehicle inlet 110 than the vehicle contactors 131, 132 are. The voltage sensor 121 detects direct-current voltage between the charging lines PL1, NL1, and outputs the detection result to the ECU 100. The current sensor 122 is provided on the charging line PL1. The current sensor 122 detects electric current that flows along the charging line PL1, and outputs the detection result to the ECU 100. Based on the detection results of the voltage sensor 121 and the current sensor 122, the ECU 100 can calculate a supply electric power from the charger 2.

The vehicle contactor 131 is connected to the charging line PL1, and the vehicle contactor 132 is connected to the charging line NL1. The opening-closing of the vehicle contactors 131, 132 is controlled depending on a command from the ECU 100. When the vehicle contactors 131, 132 are closed and the system main relays 141, 142 are closed, electric power can be transferred between the vehicle inlet 110 and the battery 150.

The battery 150 supplies electric power for generating driving force of the vehicle 1. The battery 150 stores electric power generated by the motor generators 171, 172. The battery 150 is an assembled battery configured to include a plurality of cells (not illustrated), and each cell is a secondary battery such as a lithium-ion secondary battery or a nickel-hydrogen secondary battery. In the embodiment, the internal configuration of the assembled battery is not particularly limited, and therefore, hereinafter, the assemble battery is referred to as merely the battery 150, without mentioning the cells particularly. The battery 150 may be a capacitor such as an electric double layer capacitor. The battery 150 can be regarded as an "electric storage device" according to the disclosure.

A positive electrode of the battery 150 is electrically connected to a node ND1 through the system main relay 141. The node ND1 is electrically connected to the charging line PL1 and the electric power line PL2. Similarly, a negative electrode of the battery 150 is electrically connected to a node ND2 through the system main relay 142. The node ND2 is electrically connected to the charging line NL1 and the electric power line NL2. The opening-closing of the system main relay 141, 142 is controlled depending on a command from the ECU 100.

The battery 150 is provided with a voltage sensor 151, a current sensor 152 and a temperature sensor 153. The voltage sensor 151 detects a voltage VB of the battery 150. The current sensor 152 detects an electric current IB that is input to or output from the battery 150. The temperature sensor 153 detects a temperature TB of the battery 150. Each sensor outputs the detection result to the ECU 100.

The PCU 160 is electrically connected between the electric power lines PL2, NL2 and the motor generators 171, 172. The PCU 160, which is configured to include an unillustrated converter and an unillustrated inverter, executes bidirectional electric power conversion between the battery 150 and the motor generators 171, 172 in a state of the closing of the system main relays 141, 142.

The engine 170 is an internal combustion engine such as a gasoline engine, and generates driving force by which the vehicle 1 travels, in response to a Control signal from the ECU 300.

For example, each of the motor generators 171, 172 is a three-phase alternating-current rotary electric machine. The motor generator 171 is linked to a crankshaft of the engine 170 through the power split device 173. When the engine 170 is started, the motor generator 171 rotates the crankshaft of the engine 170, using electric power of the battery 150. Further, the motor generator 171 can generate electric power, using dynamic power of the engine 170. The alternating-current power generated by the motor generator 171 is converted by the PCU 160, into direct-current power, with which the battery 150 is charged. Further, the alternating-current power generated by the motor generator 171 is supplied to the motor generator 172 in some cases.

The motor generator 172 rotates a driving shaft, using at least one of the electric power from the battery 150 and the electric power generated by the motor generator 171. Further, the motor generator 172 can generate electric power by regenerative braking. The alternating-current power generated by the motor generator 172 is converted by the PCU 160, into direct-current power, with which the battery 150 is charged.

The power split device 173 is a planetary gear mechanism, for example, and mechanically links three elements of the crankshaft of the engine 170, a rotating shaft of the motor generator 171 and the driving shaft.

The communication module 180, 280 is a digital communication module (DCM) that can perform wireless communication with the server 5. The communication module 180,280 can be regarded as a "communication device" according to the disclosure.

Similarly to the control circuit 200, the ECU 100 is configured to include a CPU 101, a memory 102 such as a read only memory (ROM) and a random access memory (RAM), and input-output ports (not illustrated). The ECU 100 controls apparatuses such that the vehicle 1 is in a desired state, depending on signals from the sensors and the like. As a main control that is executed by the ECU 100, there is plug-in charging in which the in-vehicle battery 150 is charged with the electric power that is supplied from the charger 2. The charging progresses, while signals, commands and information are mutually sent and received through the charging cable 3 between the ECU 100 of the vehicle 1 and the control circuit 200 of the charger 2. This control will be described in detail with FIG. 5.

Configurations of Inlet and Connector

In the thus configured vehicle 1 and charger 2, the vehicle inlet 110 and the charging connector 310 have configurations according to the CHAdeMO (R) technique, as an example.

Figure 3:
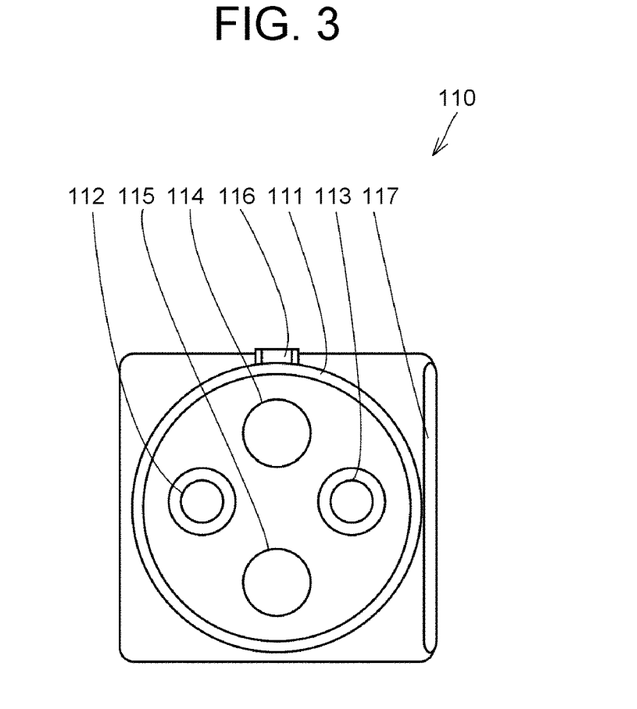
FIG. 3 is a front view showing a vehicle inlet.

FIG. 3 is a front view showing the vehicle inlet 110. With reference to FIG. 1 and FIG. 3, the vehicle inlet 110 includes a guide wall 111 formed in a cylindrical shape, the P terminal 112 and N terminal 113 provided in the guide wall 111, communication terminals 114, 115 provided in the guide wall 111, a stopper 116 provided at a top portion of the guide wall 111, and a cover 117 provided rotatably on a side surface of the guide wall 111. The charging line PL1 is electrically connected to the P terminal 112, and the charging line NL1 is electrically connected to the N terminal 113. Each of the P terminal 112 and the N terminal 113 car be regarded as an "inlet terminal" according to the disclosure.

Figure 4:
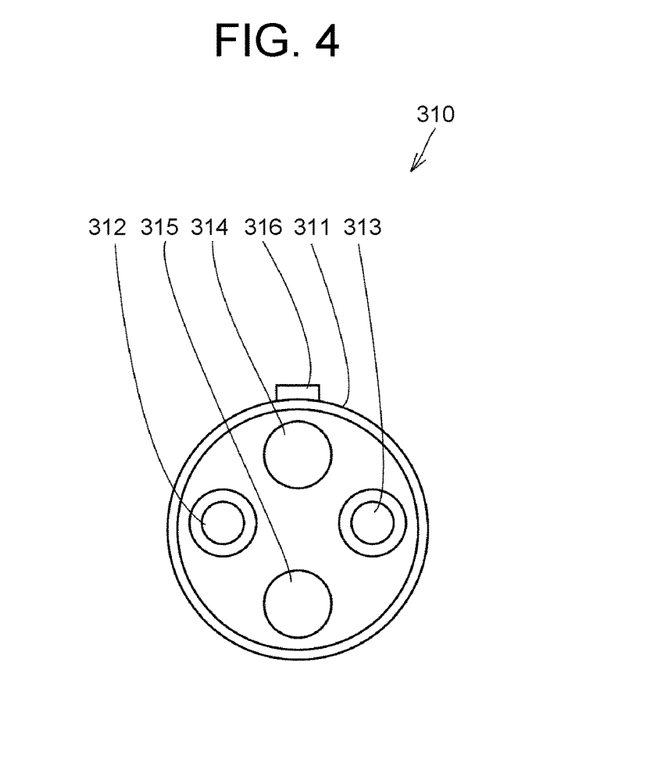
FIG. 4 is a front view showing a charging connector.

FIG. 4 is a front view showing the charging connector 310. With reference to FIG. 2 and FIG. 4, the charging connector 310 includes a guide wall 311 formed in a cylindrical shape at a distal end portion of a connector case (not illustrated) so as to be opened forward, the P terminal 312 and N terminal 313 provided in the guide wall 311, communication terminals 314, 315 provided in the guide wall 311, and a lug 316. The electric power supply line PL0 is electrically connected to the P terminal 312, and the electric power supply line NL0 is electrically connected to the N terminal 313. Each of the P terminal 312 and the N terminal 313 can be regarded as a "connector terminal" according to the disclosure.

When the user presses an operation portion (not illustrated) provided on the connector case, the lug 316 springs up sued that the lug 336 can be fixed to the stopper 116 shown in FIG. 3. When the charging connector 310 is inserted into the vehicle inlet 110, the P terminal 112 and the P terminal 312 are electrically connected to each other, and the N terminal 113 and the N terminal 313 are electrically connected to each other. Thereby, in FIG. 1, the electric power supply line PL0 and the charging line PL1 are electrically connected to each other, and the electric power supply line NL0 and the charging line NL1 are electrically connected to each other. Further, the communication terminal 114 and the communication terminal 314 are connected to each other, and the communication terminal 115 and the communication terminal 315 are connected to each other. Thereby, it is possible to perform bidirectional communication between the ECU 100 and the control circuit 200.

Abnormality Diagnosis for Charger

At the time of charging (including the time before the transfer of electric power is started), whether there is an abnormality is monitored by both of the ECU 100 of the vehicle 1 and the control circuit 200 of the charger 2. The abnormality includes an abnormality that is able to be diagnosed in a state where the charging connector 310 has been inserted into the vehicle inlet 110. Specifically, there can be an abnormality in which the P terminal 112 or N terminal 113 provided in the vehicle inlet 110 is broken, or an abnormality in which the P terminal 312 or N terminal 313 provided in the charging connector 310 is broken. Further, an abnormal heat generation of the vehicle inlet 110 or the charging connector 310 can occur due to a contact failure between contacts of the P terminal 112 and the P terminal 312 (or a contact failure between contacts of the N terminal 113 and the N terminal 313). It is difficult to find such an abnormality before the connection between the vehicle inlet 110 and the charging connector 310, and it is possible to find the abnormality at the time of the connection between the vehicle inlet 110 and the charging connector 310 or at the time of the electric power supply after the connection.

Chargers for household use are generally managed by users of vehicles. Therefore, in the case where the above-described abnormality occurs in a charger for household use, the user of the vehicle can take a necessary response, for example, can request a maintenance agency or the like to inspect and repair the charger, when the user of the vehicle is informed of the abnormality.

On the other hand, the charger 2 in a public charging facility is higher in use frequency than the charger for household use. That is, the number of times of insertion (connection) of the charging connector 310 into the vehicle inlet 110 and the number of times of removal (disconnection) of the charging connector 310 from the vehicle inlet 110 are relatively large. Therefore, it is can be said that the abnormality occurs more easily, compared to the charger for household use.

However, even when the user of the vehicle 1 is informed of the abnormality in the case where the abnormality occurs, the charger 2 is not managed by the user. Therefore, although the informed user, for example, can search for a normal charger in the vicinity to perform the charging, there is a possibility that the user does not take a particular response such as repair request for the charger 2 having the abnormality. As a result, there is a possibility that the charger 2 is left in the state where the charger 2 has the abnormality.

Hence, the embodiment adopts a configuration of diagnosing whether there is an abnormality able to be diagnosed in the state where the charging connector 310 has been inserted into the vehicle inlet 110, and in the case of diagnosing the abnormality, sending information indicating the abnormality occurrence from the vehicle 1 to the server 5 that is an external apparatus. Thereby, by the server 5 (or the administrator of the server 5), it is possible to take an appropriate response such as the repair of the charger 2.

Charging Flow

Figure 5:
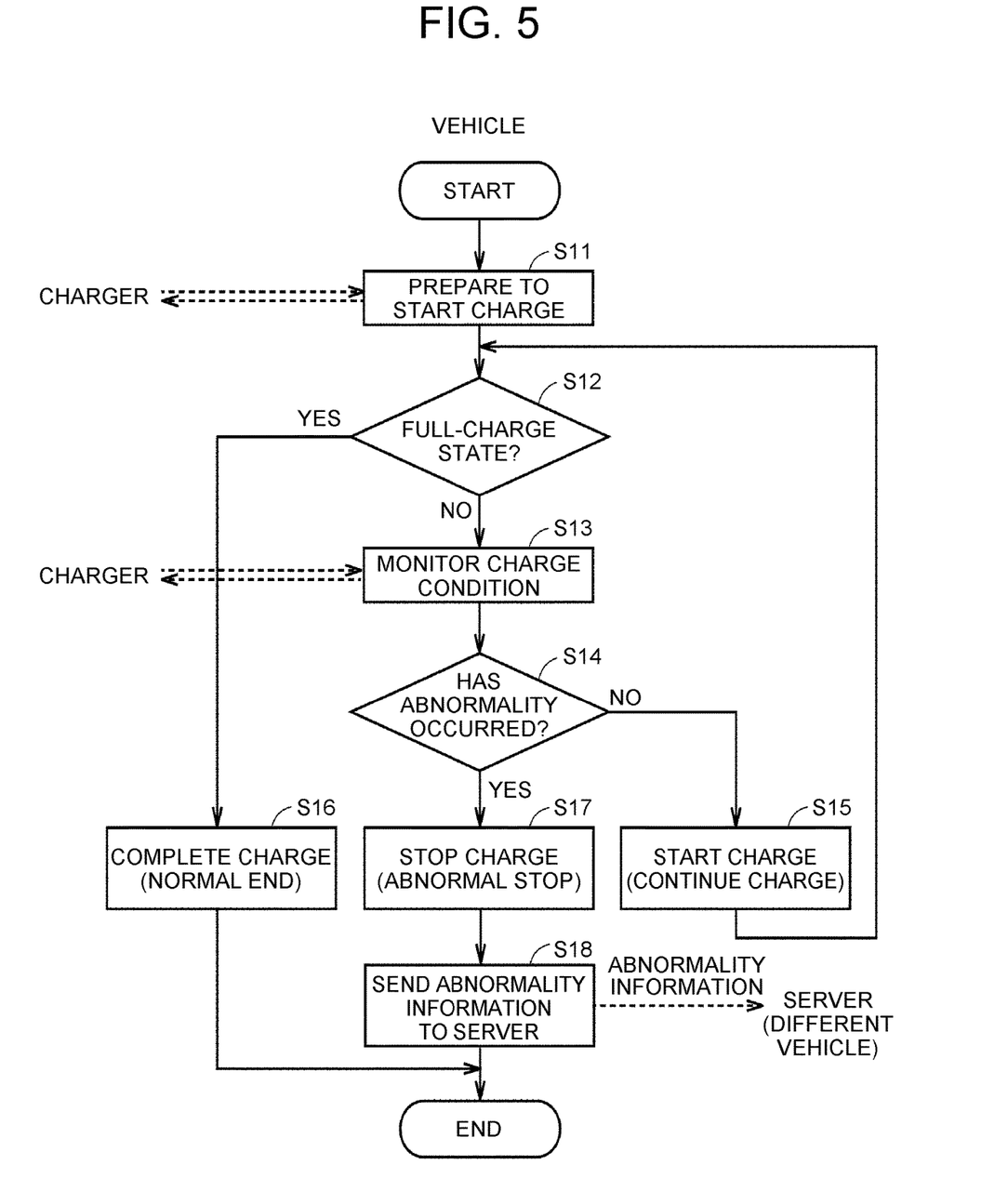
FIG. 5 is a flowchart showing charging control by the vehicle in the first embodiment.

FIG. 5 is a flowchart showing charging control by the vehicle 1 in the first embodiment. The flowcharts shown in FIG. 5 and FIG. 8 described later are executed, for example, in the case where the charging connector 310 has been inserted into the vehicle inlet 110. Each step (hereinafter, abbreviated to "S") included in the flowchart shown in FIG. 5 is basically realized by software processing with the ECU 100, but may be realized by dedicated hardware (electric circuit) made in the ECU 100.

With reference to FIG. 2 to FIG. 5, in S11, the ECU 100 prepares to start the charging, by the bidirectional communication with the control circuit 200 of the charger 2 through the charging cable 3. More specifically, the ECU 100 establishes CAN communication with the control circuit 200, or performs an information exchange process for the charging. As an example, information (the SOC (State Of Charge) of the battery 150 and the maximum voltage) about the battery 150 and signals indicating an electric power command value and the like that include a charging electric current are sent from the ECU 100 to the charger 2. On the other hand, signals indicating a determination result for compatibility of the battery 150, a predicted value of charging time, and the like are sent from the charger 2 to the ECU 100. Further, when securement of insulation condition of a charging path is diagnosed as a result of an insulation diagnosis on the charger 2 side, a notice of an insulation diagnosis completion is given from the charger 2. In response to the notice from the charger 2, the ECU 100 closes the vehicle contactors 131, 132. After such information exchanges, the preparation for the start of charging is completed.

When charging progresses normally, the following processes are executed. That is, in S12, the ECU 100 determines whether the battery 150 is in a full-charge state. In the case where the battery 150 is not in the full-charge state (NO in S12), the ECU 100 performs a process for monitoring charge condition of the battery 150 (S13). Although details will be described later, in the case where the abnormality is not detected (NO in S14), charging of the battery 150 is started (or, charging is continued if charging is being performed), and the process returns to S12. Thereby, charging of the battery 150 is continued until the battery 150 reaches the full-charge state. When the battery 150 becomes the full-charge state (YES in S12), the process proceeds to S16, and the ECU 100 determines that the charging of the battery 150 has been normally ended, and executes a normal end sequence. For example, the vehicle contactors 131, 132 are opened again.

On the other hand, in S14, the ECU 100 sometimes diagnoses the occurrence of an abnormality such as a breakage or contact failure of the P terminals 112, 312 or the N terminals 113, 313, before the start of charging of the battery 150 or during charging of the battery 150 (YES in S14). Hereinafter, the P terminals 112,312 and the N terminals 113, 313 are collectively referred to as "electric power terminal" also.

In the case where the electric power supply from the charger 2 to the vehicle 1 cannot be normally performed although communication can be performed between the vehicle 1 and the charger 2 through the communication terminals 114, 115, 314, 315, there is a possibility that the electric power terminal is broken. More specifically, in the case where a notice of a command including an electric power command value has been given from the vehicle 1 to the charger 2 in the process of S11 and where nevertheless a supply electric power satisfying the electric power command value has not been detected by the voltage sensor 121 and the current sensor 122, there is a possibility that the electric power terminal is broken. In this case, the ECU 100 stops the charging by sending a signal for requesting the stop of the electric power supply, to the charger 2 (S17). Furthermore, the ECU 100 sends information indicating the occurrence of the abnormality to the server 5 (S18).

Further, in the case where the contact failure has occurred in the electric power terminal, the contact failure increases contact resistance, so that an abnormal heat generation can be detected by the temperature sensor 119 or the temperature sensor 319. Also in this case, the ECU 100 sends the information indicating the occurrence of the abnormality, to the server 5. More specifically, in the case where the temperature sensor 119 provided in the vehicle inlet 110 has detected the abnormal heat generation of the P terminal 112 and the N terminal 113 during receiving of electric power from the charger 2, the ECU 100 sends the information indicating the occurrence of the abnormality, to the server 5 (S18). Alternatively, in the case where the temperature sensor 319 provided in the charging connector 310 has detected the abnormal heat generation of the P terminal 312 and the N terminal 313 during sending of electric power from the charger 2, the ECU 100 receives a notice of the abnormal heat generation from the control circuit 200 of the charger 2, and sends the information indicating the occurrence of the abnormality, to the server 5. In both cases, the ECU 100 stops the charge, by sending the signal tor requesting the stop of the electric power supply, to the charger 2, in addition to the information indicating the occurrence of the abnormality.

In both of the case where the P terminal 112 or N terminal 113 of the vehicle inlet 110 is broken and the case where the P terminal 312 or N terminal 313 of the charging connector 310 is broken, the electric power supply from the charger 2 to the vehicle 1 cannot be normally performed, and therefore, there is a possibility that the former case and the latter case cannot be discriminated from each other. That is, there is a possibility that it is impossible to specify whether the abnormality has occurred on the vehicle inlet 110 side or on the charging connector 310 side, namely, the spot of the abnormality occurrence. However, in the case where the server 5, as for an identical charger 2, receives the information indicating the occurrence of the abnormality from a plurality of vehicles, the server 5 can determine that there is a high possibility that the abnormality has occurred on the charger 2 side.

Process Flow of Server

Next, a series of processes to be executed by the server 5 that receives the information indicating the occurrence of the abnormality from the vehicle 1 will be described.

Figure 6:
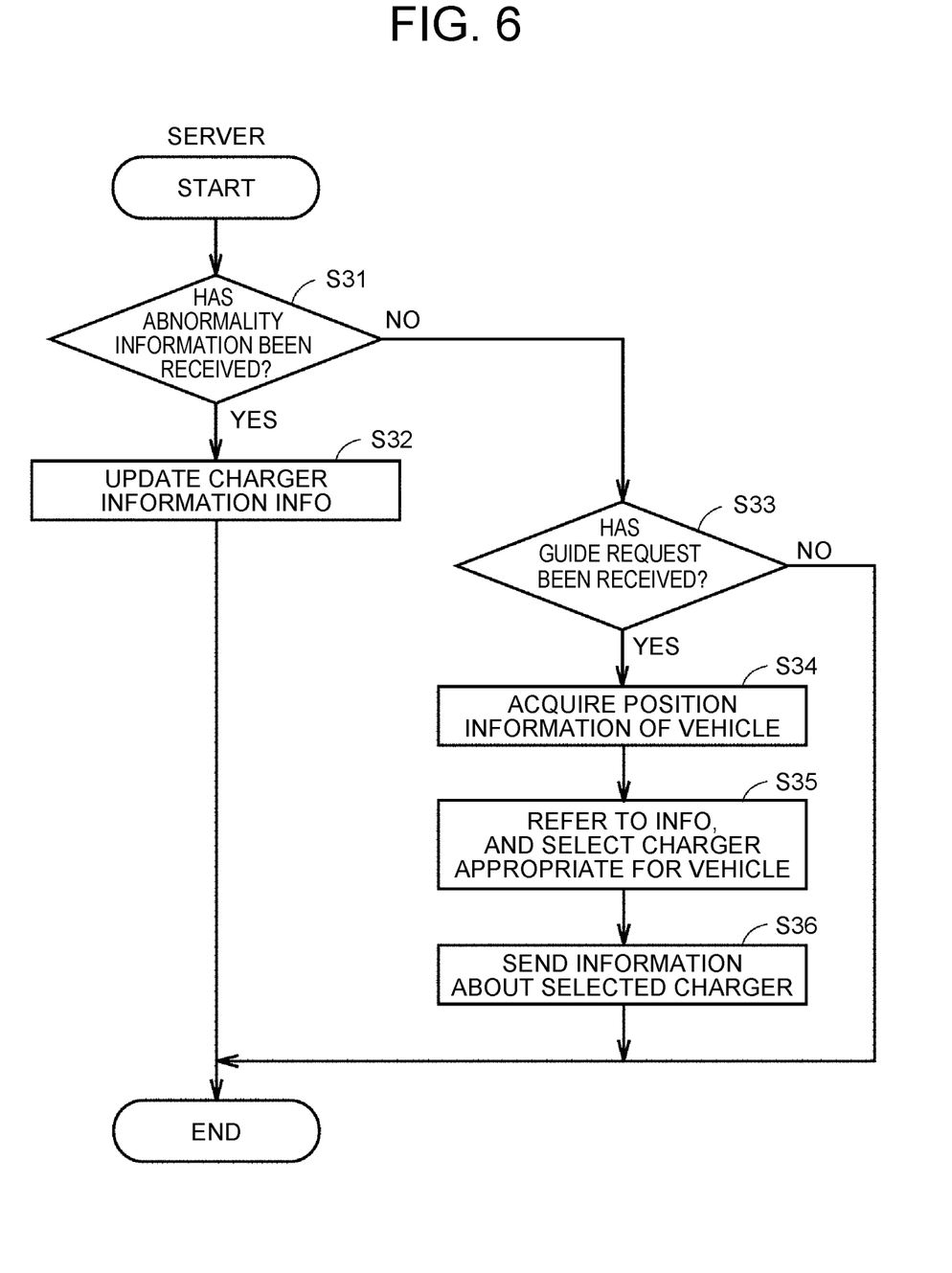
FIG. 6 is a flowchart showing a process by a server in the first embodiment.

FIG. 6 is a flowchart showing a process by the server 5 in the first embodiment. For example, the flowchart is called from a main routine (not illustrated) and is executed by the server 5, whenever a predetermined control period elapses.

With reference to FIG. 1, FIG. 2 and FIG. 6, in S31, the server 5 determines whether the information indicating the abnormality has been received from the vehicle 1. In the case where the information indicating the occurrence of the abnormality has been received from the vehicle 1 (YES in S31), the server 5 updates the charger information INFO stored in the charger information database 51 (S32).

Figure 7:
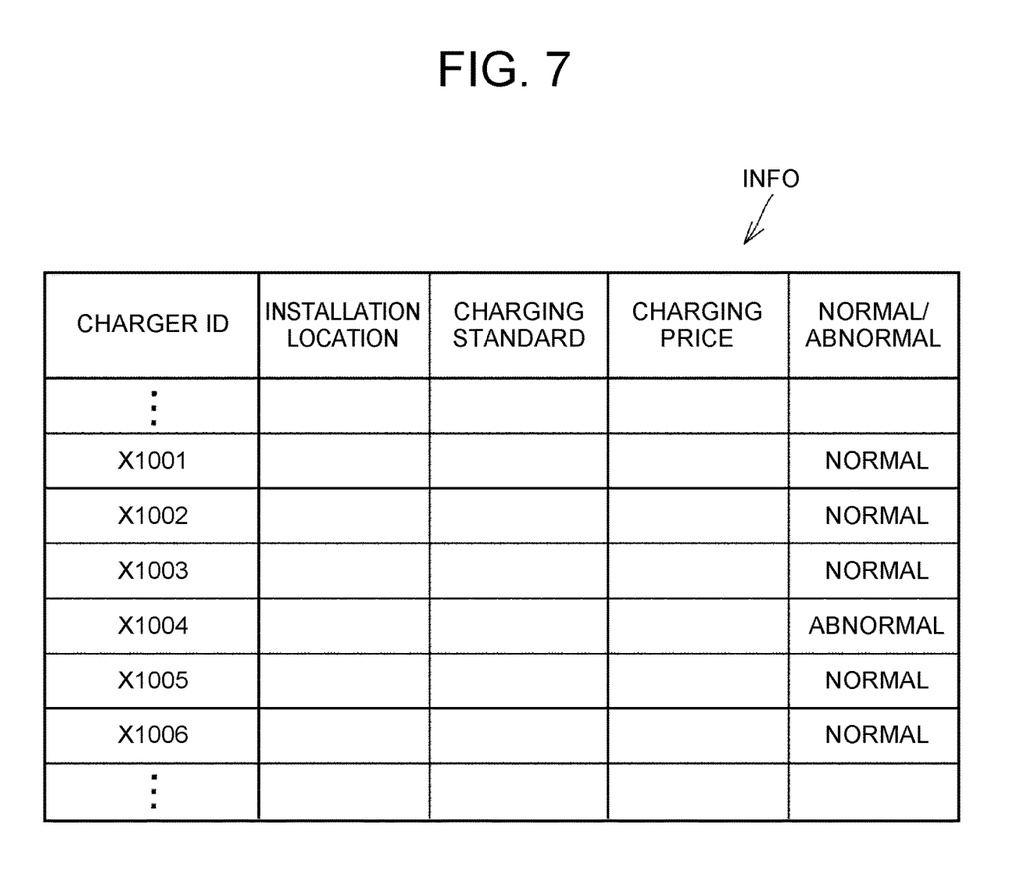
FIG. 7 is an exemplary charger information map.

FIG. 7 is a diagram showing an example of the charger information INFO. As shown in FIG. 7, the charger information INFO includes identification information (charger ID) of chargers, as well as information indicating installation location, supported charging standard and charging price for each charger, and the like. Further, the charger information INFO includes information indicating whether there is an abnormality such as a breakage or contact failure of the electric power terminal for each charger. By reference to the charger information INFO, the server 5 can determine which charger has an abnormality. Further, by updating the charger information INFO when necessary, as described later, it is possible to guide a different vehicle 9 to an appropriate charger, based on the updated (latest) charger information INFO.

Back to FIG. 6, in the case where the information indicating the occurrence of the abnormality has not been received from the vehicle 1 (NO in S31), she server 5 determines whether a guide request for the charger has been received from a different vehicle 9 (which may be the vehicle 1) (S33). In the case where the guide request for the charger has been received (YES in S33), the server 5 acquires position information indicating the current position of the vehicle 9 (S34). The server 5 may acquire information about a planned traveling route of the vehicle 9, together with the position information. The order of the acquisition of the guide request, the position information and the like does not matter. The server 5 may acquire the position information and the like, simultaneously with the guide request.

In S35, the server 5 refers to the charger information INFO, and selects a charger appropriate for the vehicle 9. More specifically, from normal chargers, the server 5 selects a charger satisfying conditions such as the current position of the vehicle 9 and the supported standard. The server 5 may consider a condition of a charging price expected by the user (for example, a condition that the charging price is equal to or lower than an expected price value set by the user). Then, the server 5 sends information about the charger selected in S35, to the vehicle 9 (S36). Instead of the vehicle 9, the server 5 may send the charger information to the smartphone (not illustrated) of the user of the vehicle 9.

In FIG. 6, the processes of S31 and S32 and the processes of S33 to S36 are shown in the identical flow. However, the processes of S31 and S32 and the processes of S33 to S36 may be executed in parallel, as different flows.

As described above, with the first embodiment, in the case of the occurrence of the abnormality that is able to be diagnosed in the state where the charging connector 310 has been inserted into the vehicle inlet 110, for example, in the case of the occurrence of the breakage or contact failure of the electric power terminal, the information indicating the occurrence of the abnormality is sent from the vehicle 1 to the server 5. Thereby, the server 5 (or the administrator of the server 5) can take an appropriate response such as the repair of the charger 2. Specifically, in the case where the charger 2 is managed by the administrator of the server 5, it is possible to perform a repair request from the server 5 to a maintenance agency. In the case where the charger 2 is managed by a different agency from the administrator of the server 5, it is possible to give a notice of the abnormality from the server 5 to the different agency, so that the different agency can perform the repair request.

In the first embodiment, as examples of the abnormality that is able to be diagnosed in the state where the charging connector 310 has been inserted into the vehicle inlet 110, the breakage or contact failure of the electric power terminal has been described, but the above abnormality is not limited to this. For example, the above abnormality may be the breakage at a connection spot between the electric power terminal and a conductive wire (not illustrated) of a connection cable. Further, the above abnormality may include the abnormality of the AC-DC convener 210 of the charger 2.

Further, the destination to which the information indicating the occurrence of the abnormality is sent is not limited to the server 5. For example, the vehicle 1 may send the information indicating the occurrence of the abnormality directly to a different vehicle 9 (see FIG. 1) existing around the vehicle 1, by a so-called inner-vehicle communication. Thereby, the user of the different vehicle 9 can perform the charging with a charger different from the charger having the abnormality.

Second Embodiment

In the first embodiment, the configuration in which the information indicating the occurrence of the abnormality is sent from the vehicle 1 to the server 5 outside has been described as an example. However, the source from which the information indicating the occurrence of the abnormality is sent may be the charger 2.

Figure 8:
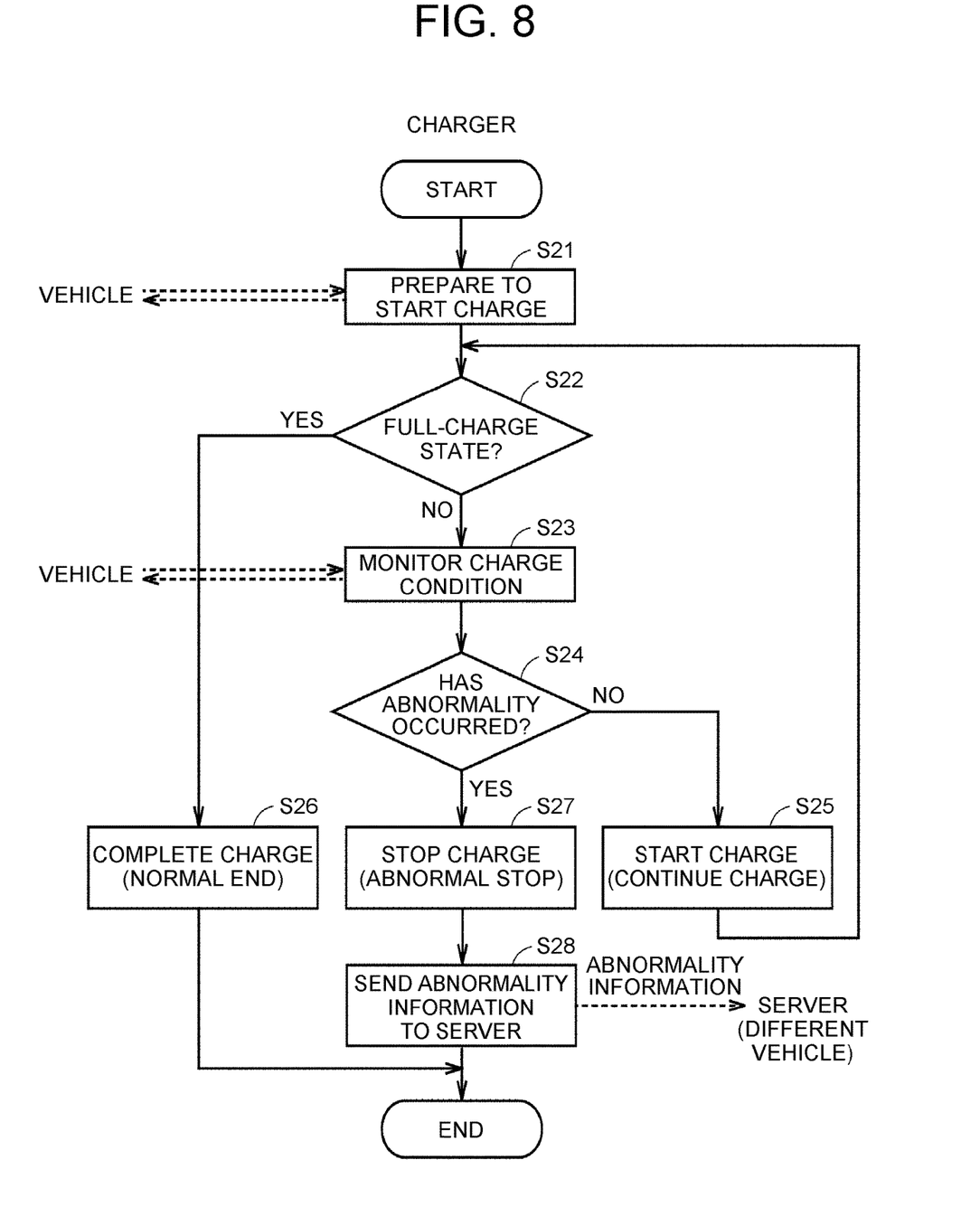
FIG. 8 is a flowchart showing charging control by a charger in a second embodiment.

FIG. 8 is a flowchart showing charging control by the charger 2 in a second embodiment. Each step (hereinafter, abbreviated to "S") included in the flowchart is basically realized by software processing with the control circuit 200, but may be realized by dedicated hardware (electric circuit) made in the control circuit 200.

With reference FIG. 8, the flowchart is basically the same as the flowchart (see FIG. 5) in the first embodiment, except that the flowchart is executed by the control circuit 200 of the charger 2 instead of the ECU 100 of the vehicle 1. Therefore, the detailed description will not be repeated.

With the second embodiment, in the case of the occurrence of the abnormality that is able to be diagnosed in the state where the charging connector 310 has been inserted into the vehicle inlet 110, the information indicating the occurrence of the abnormality is sent from the charger 2 to the server 5 (or a different vehicle 9). Thereby, similarly to the first embodiment, the server 5 (or the administrator of the server 5) can take an appropriate response such as the repair of the charger 2.

In the first embodiment, the configuration of adopting CHAdeMO that is a standard for DC charging in which direct-current power is supplied from the charger 2 to the vehicle has been described, but the standard for DC charging is not limited to this. Further, the abnormality diagnosis method for the charger according to the disclosure can be applied also to AC charging in which alternating-current power is supplied from a charger to a vehicle and an AC-DC conversion is performed in the vehicle.

It should be understood that the embodiments disclosed herein are examples and are not limiting in all respects. It is intended that the scope of the disclosure is shown not by the above description of the embodiments but by the claims, and includes all modifications in a meaning and scope equivalent to the claims.

What is claimed is:

1. A vehicle configured to perform communication with a charger provided outside of the vehicle through a charging cable, the vehicle comprising:
    an inlet configured to allow a connector of the charging cable to be inserted into the inlet, the inlet includes an inlet terminal and the connector includes a connector terminal configured to output electric power in a state where the connector terminal is electrically connected to the inlet terminal;
    an electric storage device configured to be charged from the charger through the connector and the inlet;
    a communication device configured to perform communication with an external apparatus other than the charger provided outside of the vehicle;
    a charging line;
    a voltage sensor configured to detect voltage of the charging line; and
    a current sensor configured to detect electric current that flows along the charging line; and
    an electronic control unit configured to control charging through the connector and the inlet, wherein:
    the electronic control unit being configured to diagnose whether there is an abnormality in the charger, when the charger and the vehicle are connected to each other through the charging cable, the abnormality being able to be diagnosed in a state where the connector has been inserted into the inlet, and
    the electronic control unit being configured to send information indicating an abnormality occurrence, to the external apparatus through the communication device, when the electronic control unit diagnoses the charger as having the abnormality, the information indicating the abnormality occurrence is information indicating a connection abnormality between the inlet terminal and the connector terminal in the state where the connector has been inserted into the inlet,
    the electronic control unit is configured to calculate a supply electric power from the charger based on detection results of the voltage sensor and the current sensor, and
    the electronic control unit is configured to send the information indicating the abnormality occurrence, to the external apparatus, when the electronic control unit gives a notice of a command including an electric power command value, to the charger and the electronic control unit determines that the supply electric power does not satisfy the electric power command value in the state where the connector has been inserted into the inlet.

2. The vehicle according to claim 1, wherein:
    the connector further includes a temperature sensor that detects a temperature of the connector terminal;
    the charger further includes a control circuit that receives a signal from the temperature sensor;
    the control circuit is configured to diagnose whether there is an abnormal heat generation in the connector based on the signal from the temperature sensor during sending of electric power from the charger; and
    the electronic control unit is configured to send the information indicating the abnormality occurrence, to the external apparatus, when the electronic control unit receives, from the charger, a notice indicating that the abnormal heat generation of the connector terminal has occurred.

3. The vehicle according to claim 1, wherein:
    the inlet further includes a temperature sensor that detects a temperature of the inlet terminal;
    the electronic control unit is configured to receive a signal from the temperature sensor and diagnoses whether there is an abnormal heat generation in the inlet during receiving of electric power from the charger; and
    the electronic control unit is configured to send the information indicating the abnormality occurrence, to the external apparatus, when the electronic control unit diagnoses that the abnormal heat generation of the inlet terminal has occurred.

4. The vehicle according to claim 1, wherein the external apparatus includes a different vehicle other than the vehicle, and a server that manages whether there is an abnormality in a plurality of chargers including the charger.

5. A vehicle configured to perform communication with a charger provided outside of the vehicle through a charging cable, the vehicle comprising:
    an inlet configured to allow a connector of the charging cable to be inserted into the inlet, the inlet includes an inlet terminal and the connector includes a connector terminal configured to output electric power in a state where the connector terminal is electrically connected to the inlet terminal;
    an electric storage device configured to be charged from the charger through the connector and the inlet;
    a communication device configured to perform communication with an external apparatus other than the charger provided outside of the vehicle; and
    an electronic control unit configured to control charging through the connector and the inlet, wherein:
    the electronic control unit being configured to diagnose whether there is an abnormality in the charger, when the charger and the vehicle are connected to each other through the charging cable, the abnormality being able to be diagnosed in a state where the connector has been inserted into the inlet, and
    the electronic control unit being configured to send information indicating an abnormality occurrence, to the external apparatus through the communication device, when the electronic control unit diagnoses the charger as having the abnormality, the information indicating the abnormality occurrence is information indicating a connection abnormality between the inlet terminal and the connector terminal in the state where the connector has been inserted into the inlet,
    the connector further includes a temperature sensor that detects a temperature of the connector terminal;

the charger further includes a control circuit that receives a signal from the temperature sensor;

the control circuit is configured to diagnose whether there is an abnormal heat generation in the connector based on the signal from the temperature sensor during sending of electric power from the charger; and the electronic control unit is configured to send the information indicating the abnormality occurrence, to the external apparatus, when the electronic control unit receives, from the charger, a notice indicating that the abnormal heat generation of the connector terminal has occurred.

6. A vehicle configured to perform communication with a charger provided outside of the vehicle through a charging cable, the vehicle comprising:

an inlet configured to allow a connector of the charging cable to be inserted into the inlet, the inlet includes an inlet terminal and the connector includes a connector terminal configured to output electric power in a state where the connector terminal is electrically connected to the inlet terminal, the inlet includes a temperature sensor that detects a temperature of the inlet terminal;

an electric storage device configured to be charged from the charger through the connector and the inlet;

a communication device configured to perform communication with an external apparatus other than the charger provided outside of the vehicle; and an electronic control unit configured to control charging through the connector and the inlet, wherein:

the electronic control unit being configured to diagnose whether there is an abnormality in the charger, when the charger and the vehicle are connected to each other through the charging cable, the abnormality being able to be diagnosed in a state where the connector has been inserted into the inlet, and the electronic control unit being configured to send information indicating an abnormality occurrence, to the external apparatus through the communication device, when the electronic control unit diagnoses the charger as having the abnormality, the information indicating the abnormality occurrence is information indicating a connection abnormality between the inlet terminal and the connector terminal in the state where the connector has been inserted into the inlet, the electronic control unit is configured to receive a signal from the temperature sensor and diagnoses whether there is an abnormal heat generation in the inlet during receiving of electric power from the charger; and the electronic control unit is configured to send the information indicating the abnormality occurrence, to the external apparatus, when the electronic control unit diagnoses that the abnormal heat generation of the inlet terminal has occurred.

* * * * *

UNITED STATES PATENT AND TRADEMARK OFFICE
CERTIFICATE OF CORRECTION

| | | |
|---|---|---|
| PATENT NO. | : 10,967,753 B2 | Page 1 of 1 |
| APPLICATION NO. | : 16/254039 | |
| DATED | : April 6, 2021 | |
| INVENTOR(S) | : Hidetoshi Kusumi | |

It is certified that error appears in the above-identified patent and that said Letters Patent is hereby corrected as shown below:

In the Specification

In Column 8, Line(s) 12, delete "feast" and insert --least--, therefor.

In Column 11, Line(s) 9, after "it", delete "is".

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*